United States Patent
Ekman et al.

(10) Patent No.: US 6,985,732 B1
(45) Date of Patent: Jan. 10, 2006

(54) HANDOVER IN A MOBILE COMMUNICATION SYSTEM USING CONFERENCE FACILITY

(75) Inventors: Jani Ekman, Tampere (FI); Panu Suontausta, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/937,047

(22) PCT Filed: Mar. 30, 2000

(86) PCT No.: PCT/EP00/02860

§ 371 (c)(1),
(2), (4) Date: Jan. 8, 2002

(87) PCT Pub. No.: WO00/60894

PCT Pub. Date: Oct. 12, 2000

(30) Foreign Application Priority Data

Apr. 6, 1999 (GB) .............................. 9907803

(51) Int. Cl.
*H04Q 7/20* (2006.01)
*H04Q 7/38* (2006.01)

(52) U.S. Cl. ....................... 455/436; 455/432; 455/436; 455/550; 455/556; 455/557; 370/338; 370/401; 370/913

(58) Field of Classification Search ................ 455/432, 455/436, 550, 556, 557, 465, 440, 445, 461, 455/443, 433, 450; 370/338, 401, 913; 379/93
See application file for complete search history.

(56) References Cited

U.S. PATENT DOCUMENTS 5,845,211 A * 12/1998 Roach, Jr. ................... 455/436
6,073,015 A * 6/2000 Berggren et al. .......... 455/432.2
6,243,581 B1 * 6/2001 Jawanda .................. 455/432.2
6,510,322 B1 * 1/2003 Schulte-Kellinghaus .... 455/450
6,516,193 B1 * 2/2003 Salmela et al. .......... 455/432.3
6,729,929 B1 * 5/2004 Sayers et al. ............... 455/446

FOREIGN PATENT DOCUMENTS

WO    WO98/17048    4/1998
WO    WO98/59467    12/1998

OTHER PUBLICATIONS

Wang, J., et al: "Wireless Voice–over–IP and Implications for Third–generation Network Design", Bell Labs Technical Journal, Jul. 1, 1998–Sep. 1, 1998, pp. 79–97.
Thom, G.: "H.323: The Multimedia Communications Standard for Local Area Networks", IEEE Communications Magazine, Dec. 1, 1996, pp. 52–56.
Catchpole, A.: "Voice–Data Convergence and the Corporate Voice–over–IP Trial", British Telecommunications Engineering, vol. 17, Jan. 1, 1999, pp. 218–224.

* cited by examiner

*Primary Examiner*—David Hudspeth
*Assistant Examiner*—Julio Perez
(74) *Attorney, Agent, or Firm*—Lackenbach Siegel, LLP

(57) ABSTRACT

A communications network comprises a central controller which operates to control a zone of the network and which provides a conference call facility with at least one gateway engaged in a call with a mobile station via a first communication channel, means for generating a hand-off required indication indicating that handover of the call is needed, means at the central controller for receiving said hand-off required indication and opening a conference call channel as a second communication channel for the call and means for handing over said call from the first to the second communication channels and, if the handover is successful, causing the first communication channel to be closed.

12 Claims, 8 Drawing Sheets

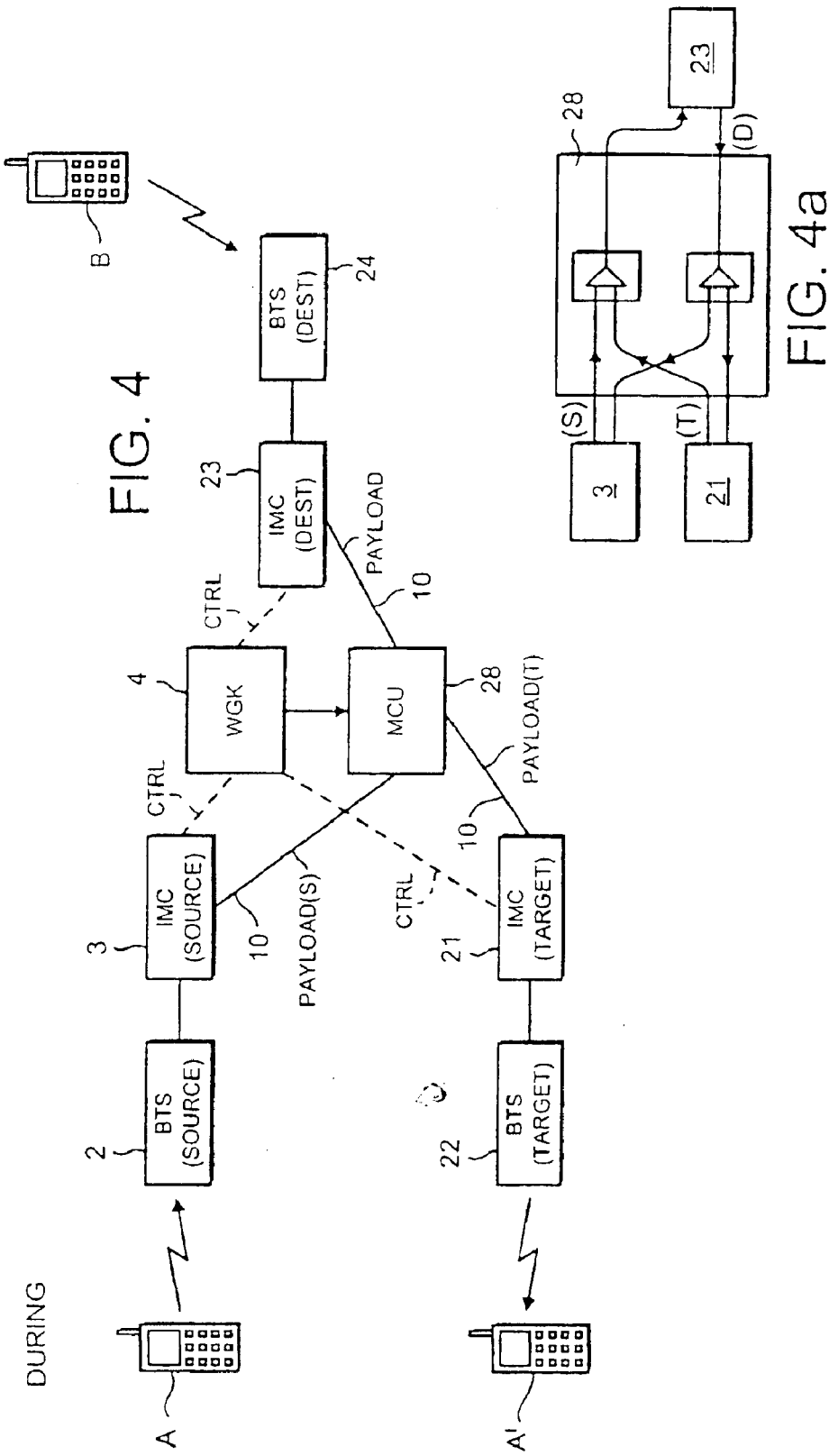

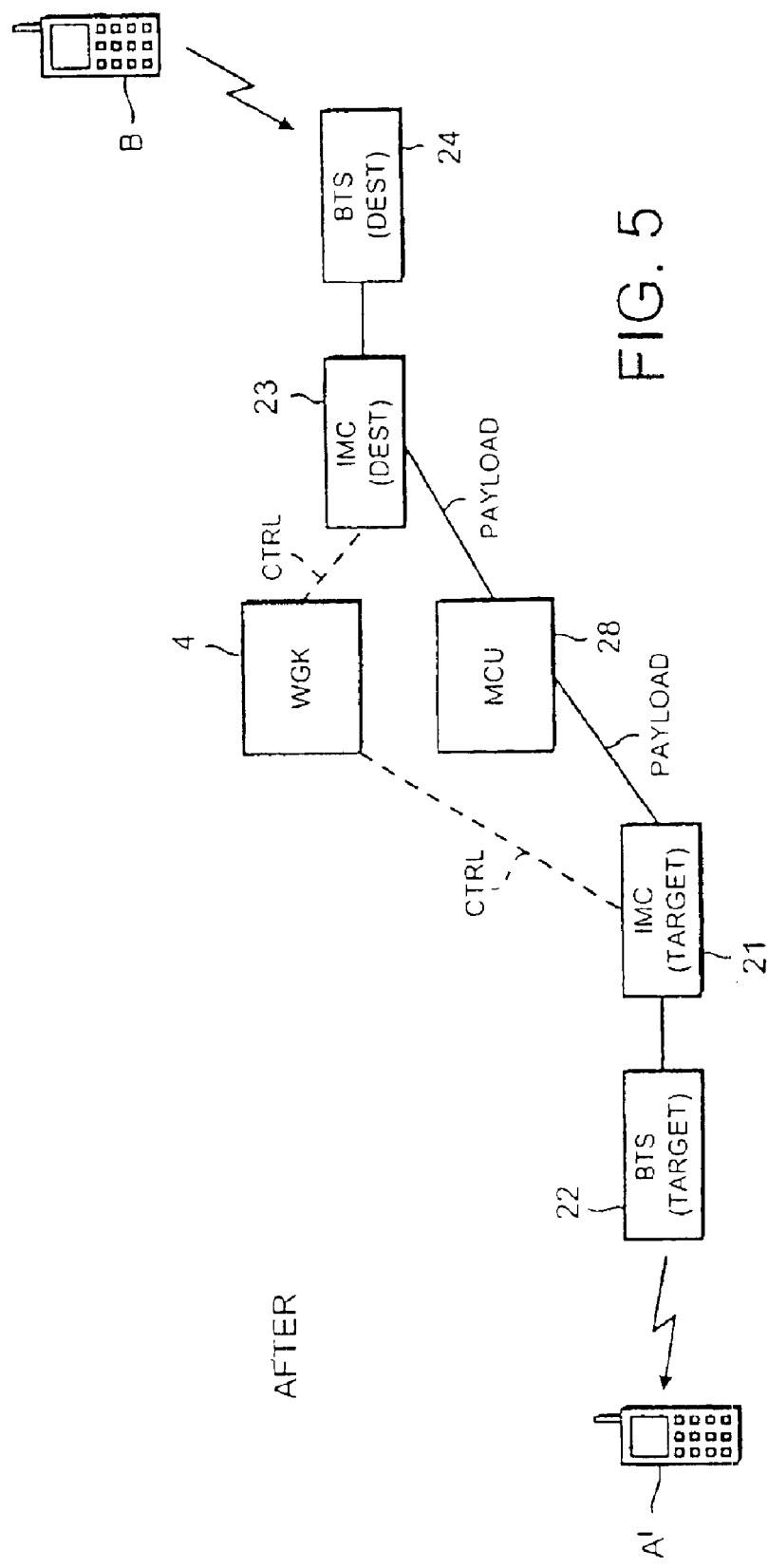

HANDOVER IN A MOBILE COMMUNICATION SYSTEM USING CONFERENCE FACILITY

The present invention is related to handovers in a mobile communication system and particularly, but not exclusively, to mobile station handovers in an IP-based telecommunications network.

Prior art office-based communications systems usually operate conventional fixed-line telephone units linked via an internal switchboard or PBX (private branch exchange). Such fixed-line systems are able to provide relatively high voice quality. However, user mobility is severely impaired.

The advent of digital mobile technologies such as GSM, however, means that mobile systems can now provide equivalent, if not higher, voice quality than fixed-line systems. Mobile systems also allow greater freedom of movement for the user within the office than do fixed-line systems.

WIO (Wireless Intranet Office) is a proprietary communications system developed by the applicants which introduces the concept of utilising mobile telephone units, such as conventional GSM mobile stations, in an office environment. The system makes use of a known concept called Internet Telephony or Voice-over-IP.

Voice-over-IP is a technology which allows sound, data and video information to be transmitted over existing IP-based Local or Wide Area Networks or the Internet. The technology thus provides for convergence and integration of three different media types over the same network.

Prior to the advent of Voice-over-IP, offices often operated three separate networks for the transmission of these media types. As indicated above, fixed-line telephone systems coupled to an in-house PBX provided for voice communication, an office-based LAN or Intranet (i.e. a packet-switched internal network), comprising computer terminals linked via network cards and under the control of a server station, provided for the transmission of "conventional" computer data and video cameras linked to monitors via fixed line or remote transmission link provided for video communication.

Voice-over-IP effectively combines these three media types such that they can be transmitted simultaneously on the same packet-switched network or IP-router throughout the office environment and beyond the confines of the office.

In order to provide for such media convergence, Voice-over-IP often uses a specific ITU (International Telecommunication Union) a standard protocol to control the media flow over the Intranet. One common standard protocol used in Voice-over-IP systems, and the one used in the WIO system, is termed H.323.

H.323 is an ITU standard for multimedia communications (voice, video and data) and allows multimedia streaming over conventional packet-switched networks. The protocol provides for call control, multimedia management and bandwidth management for both point-to-point (2 end-users) and multipoint (3 or more end-users) conferences. H.323 also supports standard video and audio codecs (compression/decompression methods such as MPEG) and supports data sharing via the T.120 standard.

Furthermore, H.323 is network, platform and application independent allowing any H.323 compliant terminal to operate in conjunction with any other terminal.

The H.323 standard defines the use of three further command and control protocols:
a) H.245 for call control;
b) Q.931 based protocol for call signalling; and
c) The RAS (Registrations, Admissions and Status) signalling function.

The H.245 control protocol is responsible for control messages governing the operation of the H.323 terminal including capability exchanges, commands and indications. Q.931 is used to set up a connection between two terminals. RAS governs registration, admission and bandwidth functions between endpoints and gatekeepers (defined later).

For a H.323 based communication system, the standard defines four major components:
1. Terminal
2. Gateway
3. Gatekeeper
4. Multipoint Control Unit (MCU).

Terminals are the user end-points on the network, e.g a telephone or fax unit or a computer terminal. All H.323 compliant terminals must support voice communications, but video and data support is optional.

Gateways connect H.323 networks to other networks or protocols.

For an entirely internal communications network, i.e. with no external call facility, gateways as such are not required. In that case, internal intranet mobile clusters (IMCs) act as internal gateways.

Gatekeepers are the control centre of the Voice-over-IP network. It is under the control of a gatekeeper that most transactions (communication between two terminals) are established. Primary functions of the gatekeeper are address translation, bandwidth management and call control to limit the number of simultaneous H.323 connections and the total bandwidth used by those connections. An H.323 "zone" is defined as the collection of all terminals, gateways and multipoint-control units (MCU defined below) which are managed by a single gatekeeper.

Multipoint Control Units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

The conventional Voice-over-IP system described herein above normally utilise standard fixed-line telephone systems which are subject to the disadvantages outlined above, namely the lack of mobility and the lack of user commands.

The WIO concept takes Voice-over-IP further in that it provides for the use of conventional mobile telephone units, such as GSM mobile stations, within the Voice-over-IP system. To provide for such mobile communications within an intra-office communication network, WIO combines known Voice-over-IP, as described above, with conventional GSM-based mobile systems.

Thus, intra-office calls are routed through the office intranet and extra-office calls are routed conventionally through the GSM network. Such a system provides most or all of the features supported by the mobile station and the network such as telephone directories, short messaging, multiparty services, data calls, call barring, call forwarding etc. WIO, therefore, provides for integrated voice, video and data communications by interfacing an H.323-based voice-over-IP network with a GSM mobile network.

The WIO system is a cellular network, similar to the conventional GSM network and is divided into H.323 Zones as described above. One H.323 Zone may comprise a number of cells. Two or more H.323 zones may be contained within an administrative domain. The allocation of H.323 zones to an administrative domain is an issue primarily concerning billing and is therefore not relevant to this invention.

Given the cellular nature of the WIO system, a major issue to be solved is that of handovers. As a mobile station moves from cell to cell it reports its location to the BTS or equivalent controller. When it moves from one zone to another, a handover is needed to a different gateway. A similar consideration applies to mobile stations in the conventional GSM network.

In such conventional GSM systems, the need for a handover of a mobile station to a different cell of the network is normally determined by the mobile station measuring the strength of signals transmitted from several base transceiver stations.

During the time that it is in a particular cell, the mobile station continuously receives signals from several base transceiver stations in adjacent cells. It sends the measurement reports to the BTS/BSC which makes a decision when handover is needed. If the level of a signal transmitted by a base transceiver station, located in a different cell from that of the mobile, reaches a certain threshold level T1 in relation to that of the base transceiver station located in the mobile station's current cell, the BSC will determine that a handover to that cell is required and will issue a handover required indication to the network controller (main switching centre).

In a similar manner, the IMC of a WIO system is able to determine the requirement for handover within the WIO network by comparing the signal strengths of the signals reported by the mobile station.

However, added complexities arise for handovers in the WIO system since a mobile unit operating therein is not only able to move between cells within the WIO system, but also between zones and even between the WIO system itself and an external GSM network.

It can be seen, therefore, that there are several different types of handovers which may need to be executed in the normal operation of a WIO system. These types of handovers are:

a) The handover of a mobile from one WIO cell to another whilst engaged in a call.
b) The handover of a mobile from one WIO zone to another whilst engaged in a call.
c) The handover of a mobile from a cell within the WIO system to a cell within an external GSM system.
d) The handover from a cell within an external GSM system to a cell within the WIO system.

The call can involve a mobile station and any other endpoint or terminal, fixed or mobile.

According to one aspect of the present invention, therefore, there is provided a communications network comprising: a central controller which operates to control a zone of the network and which provides a conference call facility; at least one gateway engaged in a call with a mobile station via a first communication channel; means for generating a hand-off required indication indicating that handover of the call is needed; means at the central controller for receiving said hand-off required indication and opening a conference call channel as a second communication channel for the call; and means for handing over said call from the first to the second communication channels and, if the handover is successful, causing the first communication channel to be closed.

According to another aspect of the present invention there is provided a method of effecting handover of a call in which at least one mobile station is engaged via a first communication channel in a communications network comprising a central controller which operates a zone of the network and provides a conference call facility, in which method: a hand-off required indication is issued indicating that handover of the call is needed; the central controller receives said hand-off required indication and opens as a second communication channel a conference call channel; handover of said call is effected from said first to said second communication channel; and if the handover is successful the first communication channel is closed.

Thus, the present invention provides handover control using existing conference call functionality rather than having to provide new functionality with which to control the handover.

For a better understanding of the present invention, and to show how the same may be carried into effect, the present invention will now be described in more detail with reference to the accompanying drawings in which:

The means for generating a hand-off required indication is preferably comprised in the gateway or, for example, a mobile station.

The means for handing over may be a gatekeeper.

The communications network may be a cellular network.

FIG. 4 is a block diagram illustrating, the communication pathways between components of the WIO system during a second period of the mobile station handover according to a first embodiment;

FIG. 4a is a diagram illustrating the multiplexing within the MCU; and

FIG. 5 is a block diagram illustrating the communication pathways between components of the WIO system during a third period of the mobile station handover according to a first embodiment.

Figure 1A:
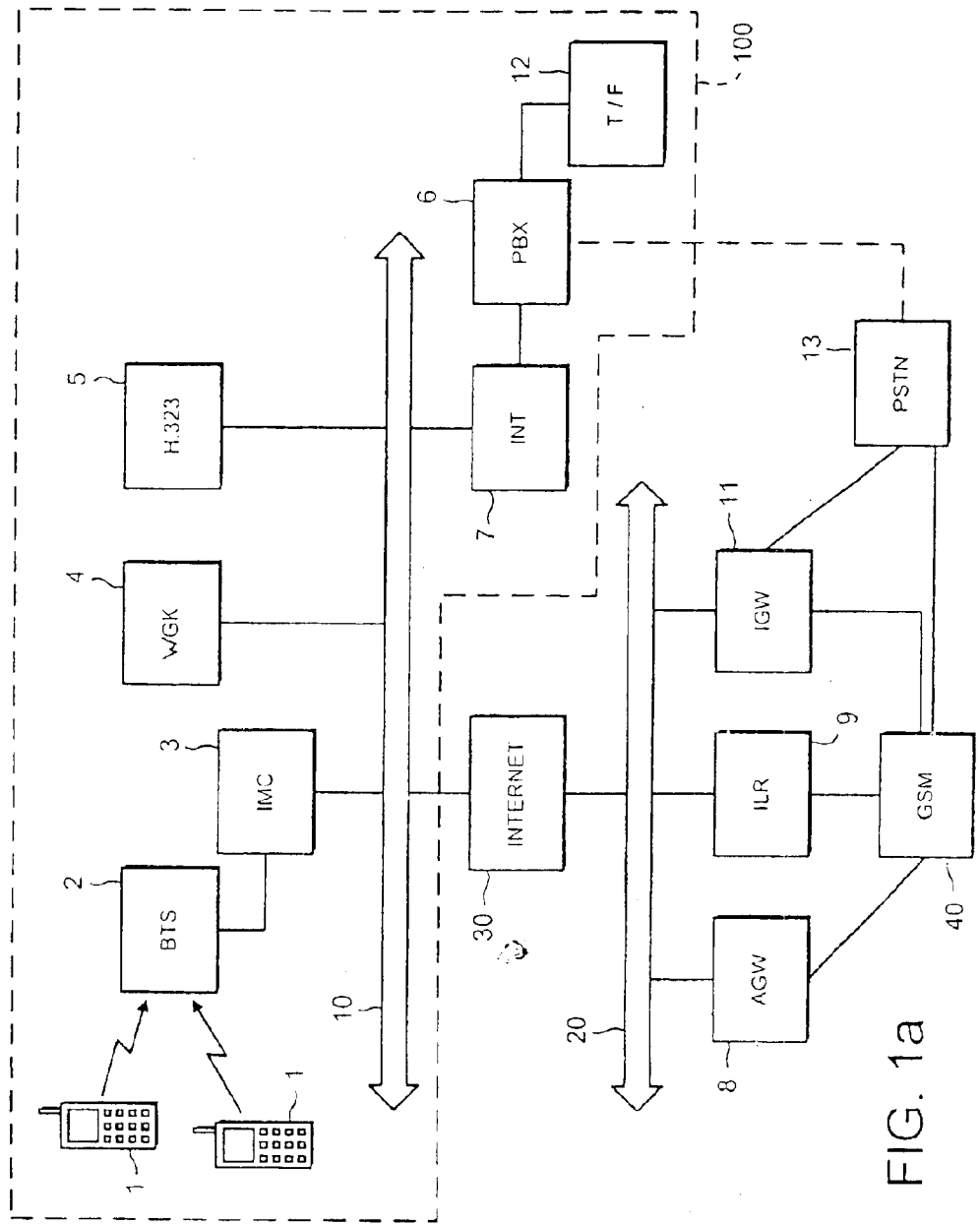
FIG. 1a is a block diagram showing some of the components used in the implementation of a WIO system.

Reference is first made to FIG. 1a to describe the context of this invention.

A WIO system can be provided in an office and operator environment based on an IP (Internet Protocol) based packet network. In practice there are two Local Area Networks (LANs) or Intranets which are operable to carry standard packet-switched data. These are connected via, e.g., a wide area network (WAN). An IP (Internet Protocol) router 10 can be used in the LAN environment as can an IP switch or hub. The office environment is denoted by a dashed box 100.

One or more mobile stations (MS) 1 communicate, i.e. transmit signals to and/or receive signals from, a base transceiver station (BTS) 2. The base transceiver station 2 used in the WIO system is similar to base transceiver stations used in conventional GSM mobile communications systems in that it is connected to, and operates in conjunction with, a controller. In a conventional GSM system, the controller is termed a base station controller (BSC); in WIO, however, the controller is represented by an Intranet Mobile Cluster interface (IMC) 3, the function of which will be described later. Also, some of the functions of a conventional BSC are located in an A-interface gateway 8 or WIO gatekeeper 4.

The base transceiver station 2 therefore receives signals transmitted by the mobile unit 1 and forwards them to the Intranet Mobile Cluster interface 3. The Intranet Mobile Cluster interface 3 is also connected to the IP-router 10.

A WIO Gatekeeper (WGK) 4 is connected to the IP-router 10 as is an H.323 terminal (H.323) 5. The H.323 terminal 5 may be represented by a computer terminal which supports voice information or an H.323 application.

One or more telephone or facsimile units (T/F) 12 are connected to a private branch exchange (PBX) 6 as in a conventional fixed-line office communication system. The private branch exchange 6 is connected to the IP-router 10 via an interface (INT) 7. The private branch exchange 6 is additionally connected to a Public Switched Telephone Network (PSTN) 13 such as a conventional BT network.

The IP-router 10 is connected to an external IP-based network 30, such as a Wide Area Network (WAN) or the Internet.

For extra-office communication, the IP-based network 30 is connected to a second IP-router 20, on the operator side, which may also be represented by a LAN or Intranet.

Connected to the second IP-router are two interfaces, an A-interface gateway (AGW) 8 and an ISDN gateway (IGW) 11, and an intranet location register (ILR) 9. The AGW 8, ISDN gateway 11 and Intranet location register 9 are also connected to a standard GSM network as used in a conventional mobile communications system. The ISDN gateway is additionally connected to the Public Switched Telephone Network (PSTN) 13.

WIO allows for the use of mobile telephone in the office environment to make both intra- and extra-office calls. The functions of each of the components of FIG. 1 will now be described in more detail.

The Intranet Mobile Cluster interface 3 performs similar functions to that of a base station controller (Base Station Controller) in a conventional GSM network such as the management of radio resources and channel configuration and the handling of the Base transceiver station configuration. However, the intranet Mobile Cluster interface also provides conversion from GSM voice data to packet based data suitable for transmitting on the packet-based IP Router 10.

During a call, therefore, the Intranet Mobile Cluster interface 3 converts the voice data transmitted by the base station into packet-based data suitable for transmitting on the IP Router 10.

The WIO Gatekeeper 4 is the main controller of the WIO system and has a high processing capability. Its function is to provide control services to the IP Router and the various user terminals. However, the Gatekeeper 4 is also responsible for all of the functions which the H.323 protocol defines to its gatekeeper, including call management and call signalling. The WIO Gatekeeper 4 is able to manage the main different call types such as voice, data, facsimile and conference calls which can be established between a mobile station, a PC terminal and a normal telephone in any combination.

The A-interface gateway 8 handles communication between the WIO environment and the GSM network via the mobile services switching centre (MSC). From the MSC viewpoint, the WIO appears to be a conventional base station controller. The A-interface gateway 8 also provides an interface for an Operations and Maintenance Unit (O&M—not shown).

The ISDN gateway (IGW) 11 handles communication between the WIO environment and the public telephone network and has an interface to both the MSC and the PSTN 13. The ISDN gateway 11 is used to enable communication mainly from a non-GSM H.323 terminal to a GSM mobile unit outside the WIO network. It also provides for the possibility of communication from a mobile station to a PC. Only GSM mobile stations can be connected to the MSC via the A-interface gateway 8. The WIO Gatekeeper 4 controls the status of the ISDN gateway 11 and sends the information to the O&M unit.

The intranet location register 9 provides the directory services in the WIO system. The purpose of the directory service is to provide storage for mobile station-specific information, such as mobile station identities and supplementary services such as billing accounts for use in the WIO system. All of the mobile stations within the WIO system have an entry in the intranet location register. The WIO Gatekeeper 4 updates the current intranet location register entry of each mobile station allowing the correct mobile number to be accessed in each call. The intranet location register is linked to the home location register (not shown) within the GSM network via a mobile application part (MAP) interface (not shown).

The telephone calls managed by the WIO system can be divided into internal calls and external calls. Internal calls involving a mobile station are those calls where the mobile station and the other terminal involved in the call are located within the WIO system, and external calls involve a mobile station or other terminal which is not located within the WIO system. Calls may also be between H.323 terminals and external PSTN subscribers.

Figure 1B:
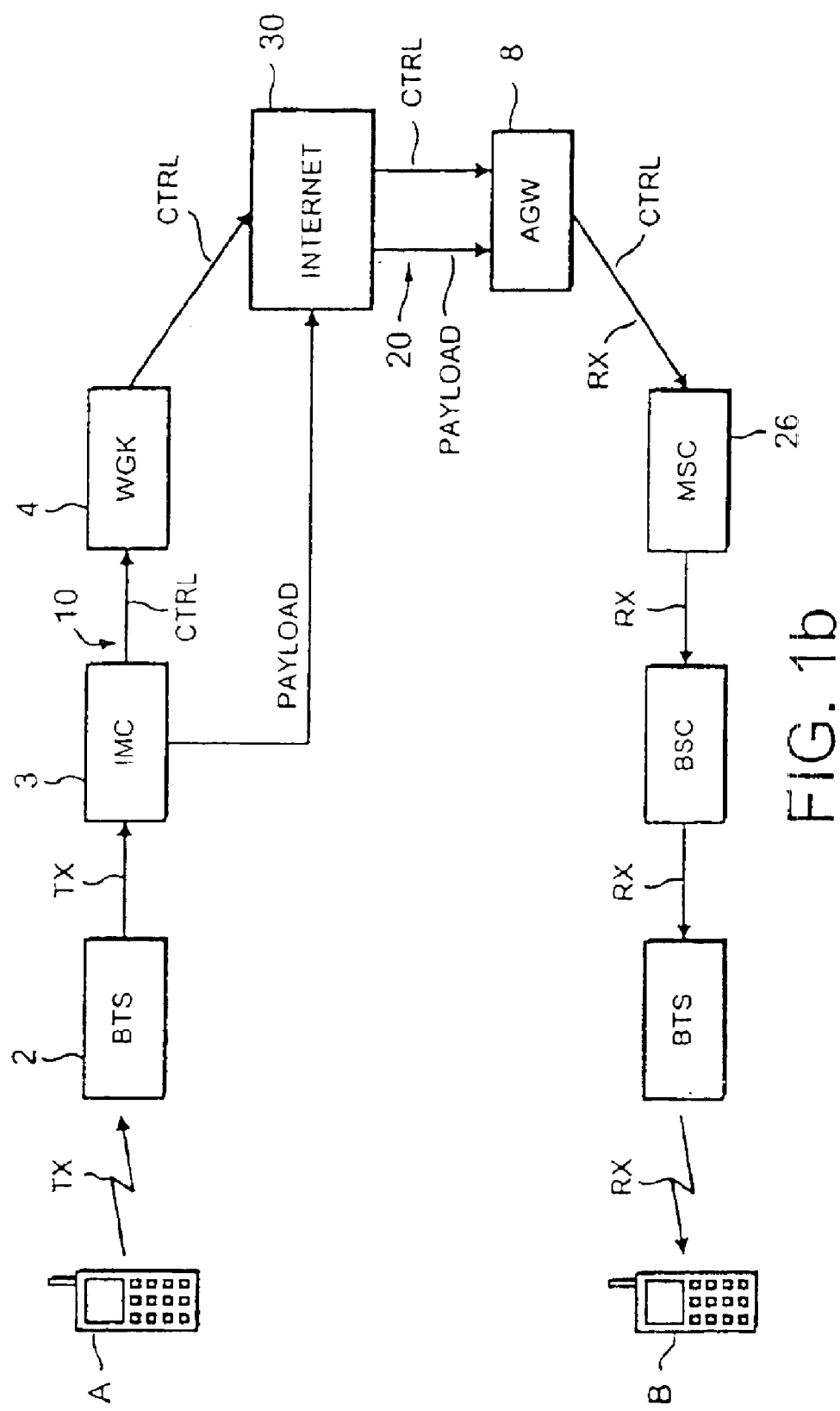
FIG. 1b is a block diagram illustrating the communication pathways used during a call between an internal mobile station and an external mobile station.

The functions of the WIO system components described above will now be described, with reference to FIG. 1b, in the context of a telephone call from a mobile station located within the WIO system (mobile A) to a mobile station located in an external network such as a GSM network (mobile B).

The mobile station A transmits a radio frequency (RF) transmission signal TX, on a predetermined communication channel, to the base transceiver station 2 in a format conventional to GSM communications systems such as a time-slot format. The communication channel on which the mobile station A transmits the RF transmission signal TX is determined in a manner conventional to GSM communications systems.

The base transceiver station 2 receives the RF transmission signal, down-converts it and then forwards it to the intranet mobile cluster interface 3. In this respect, the base transceiver station 2 and the intranet mobile cluster interface 3 operate in a manner similar to a base transceiver station and a base station controller respectively in a conventional GSM network.

The intranet mobile cluster interface 3 receives the down-converted transmission signal from the base transceiver station 2 and converts the voice data from the conventional GSM time-slot format, to a packet-based format which allows it to be transmitted along the IP-router 10. This is referred to herein as the PAYLOAD. Also, the intranet mobile cluster interface 3 composes a control signal CTRL containing call signalling messages, for example identification of the destination MS B, the IP address corresponding to that MS and/or identification of the source MS A.

The control signal CTRL is then routed, in packet format, via the IP-router 10, to the gatekeeper 4 which, based on the information contained in the control signal CTRL, determines whether the mobile station B is located within the WIO system or external to the WIO system. If the mobile station B lies outside the WIO system, e.g. a conventional GSM mobile unit operating in the GSM network, the gatekeeper 4 causes the control signal CTRL and the payload signal PAYLOAD to be routed along the IP-router 10 to the second IP-router 20 via the external network 30.

The payload signal PAYLOAD, still in packet format, is transmitted from the second IP-router 20 to the A-interface gateway 8. The A-interface gateway converts the payload signal from the packet-based format used to transmit it on the IP-routers and Internet (10, 20, 30) into a conventional GSM format such as a time-slot format.

The receive signal RX, in timeslot format, is forwarded from the A-interface gateway 8 to the Mobile Services switching centre 26 (MSC) in the GSM Network from where it is transmitted to the respective Base Station Controller/ Base transceiver station 24, under which the mobile station B is operating, in a manner conventional to GSM.

Figure 1C:
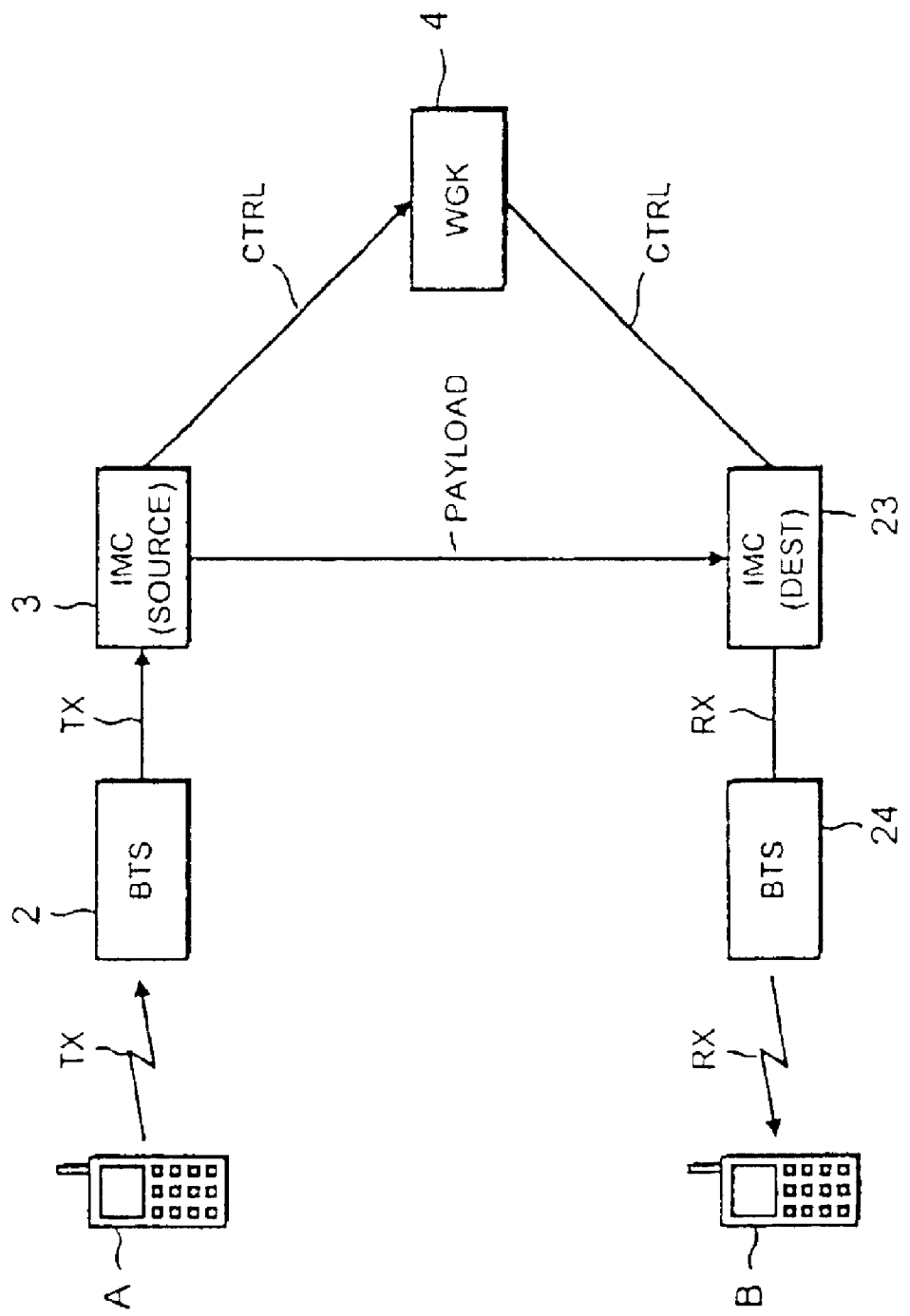
FIG. 1c is a block diagram illustrating the communication pathways used during a call between two internal mobile stations operating under the same gatekeeper.

Calls which are completely internal to the WIO system are handled slightly differently as shown in FIG. 1c. The RF transmission signal TX, in timeslot format, transmitted by the mobile A is again sent to the BTS 2 which performs down conversion of the signal. The down-converted signal is forwarded to the intranet mobile cluster interface 3 which performs format conversion to generate a PAYLOAD packet and a CTRL packet.

From the intranet mobile cluster interface 3, the control signal CTRL is sent to the Gatekeeper 4 which determines if the mobile station B is within the WIO system and, if so, in which H.323 Zone it is located. A H.323 zone is defined as the collection of all terminals, gateways and multipoint control units managed by a single gatekeeper.

If the mobile station B is operating in the same H.323 Zone as the mobile station A, i.e. under the same Gatekeeper which then starts the paging procedure, the Gatekeeper 4 will receive a paging response from the destination intranet mobile cluster interface 23, i.e. the intranet mobile cluster interface under which the mobile station B is operating, and then routes the payload along the IP-router 10 to that destination intranet mobile cluster interface.

The destination intranet mobile cluster interface 23 converts the payload signal into a timeslot format. It is then sent, via its base transceiver station 24 which performs up-conversion to RF, to the mobile station B.

Figure 1D:
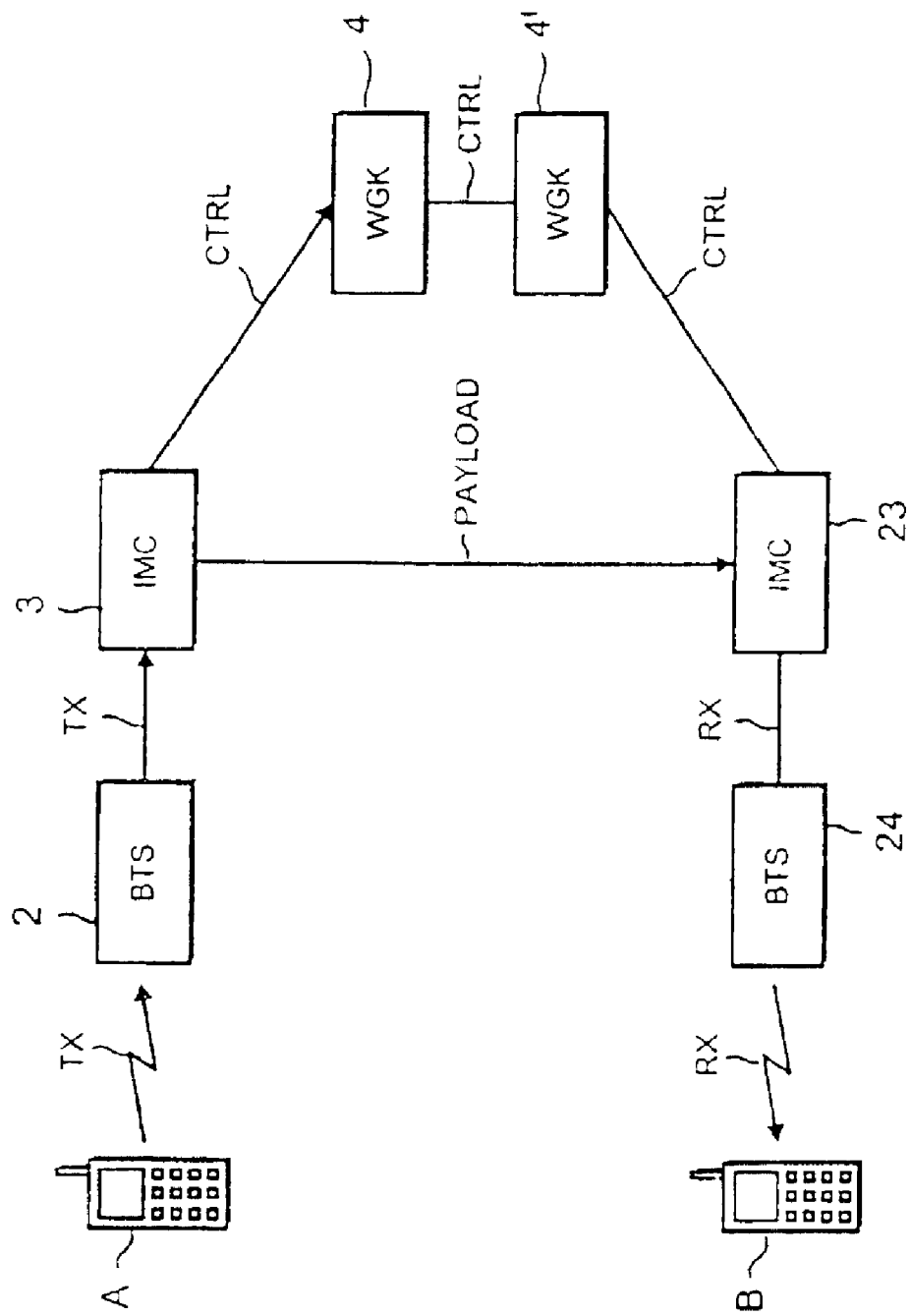
FIG. 1d is a block diagram illustrating the communication pathways used during a call between two internal mobile stations operating under different gatekeepers.

As shown in FIG. 1d, 1f the gatekeeper 4 determines that the mobile station B is in a different H.323 Zone to the mobile station A, the gatekeeper 4 routes the CTRL signal to the destination gatekeeper 4', i.e. the gatekeeper under which the mobile station B is operating. If the destination gatekeeper receives a paging response from one of the intranet mobile cluster interfaces, it then routes the call signal to the intranet mobile cluster interface and out to the mobile station B, via its base transceiver station 24, in a manner similar to that described above.

FIGS. 2 to 5 show, respectively, the communication pathways before, during and after a handover according to an embodiment of the present invention. The following description illustrates the handover of a mobile station A from a first cell of the WIO network to a second cell of the WIO network whilst in communication with a mobile station B also located within the network.

In this context, the components of the first cell, i.e. the cell out of which mobile station A will move, are termed the source components while the components of the second cell, i.e. the cell into which mobile station A will move, are termed the target components. The components of the cell in which mobile station B is located are termed the destination components. Note that the destination mobile station could be any other endpoint or terminal such as fixed phone, fax etc.

Figure 2:
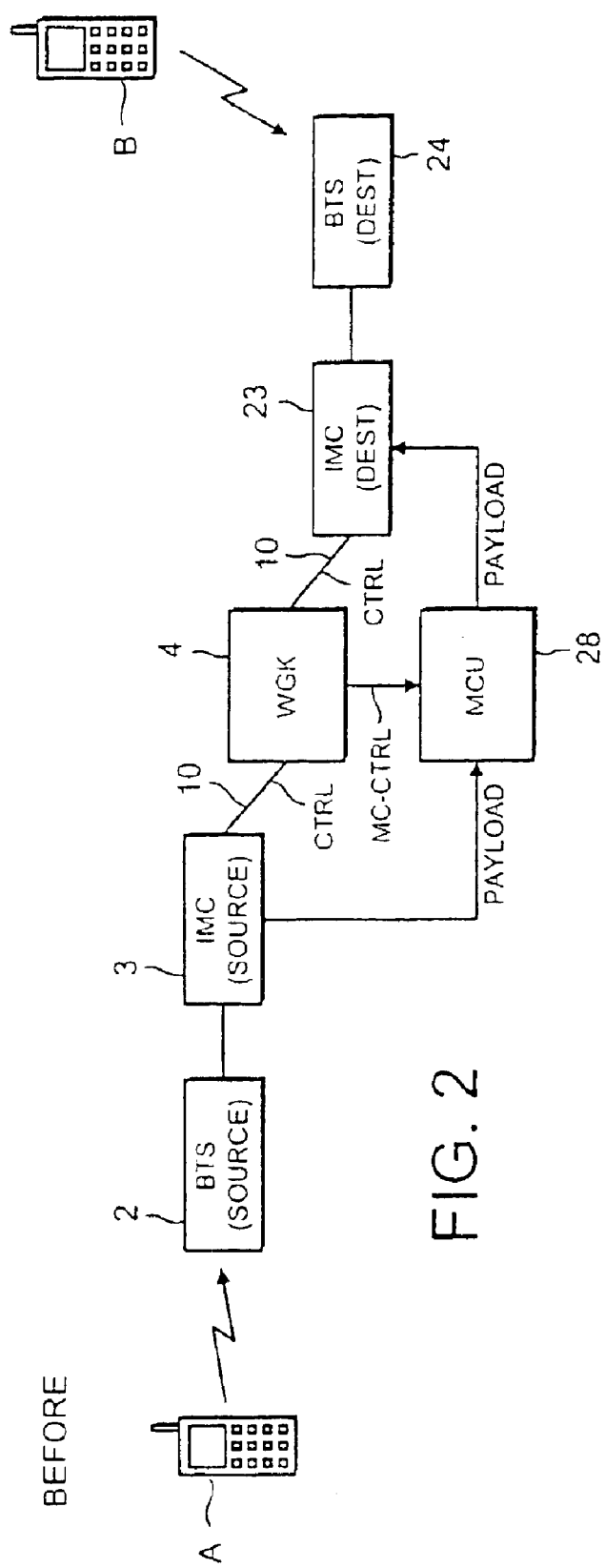
FIG. 2 is a block diagram illustrating the communication pathways between components of the WIO system before the mobile station handover according to a first embodiment.
Figure 3:
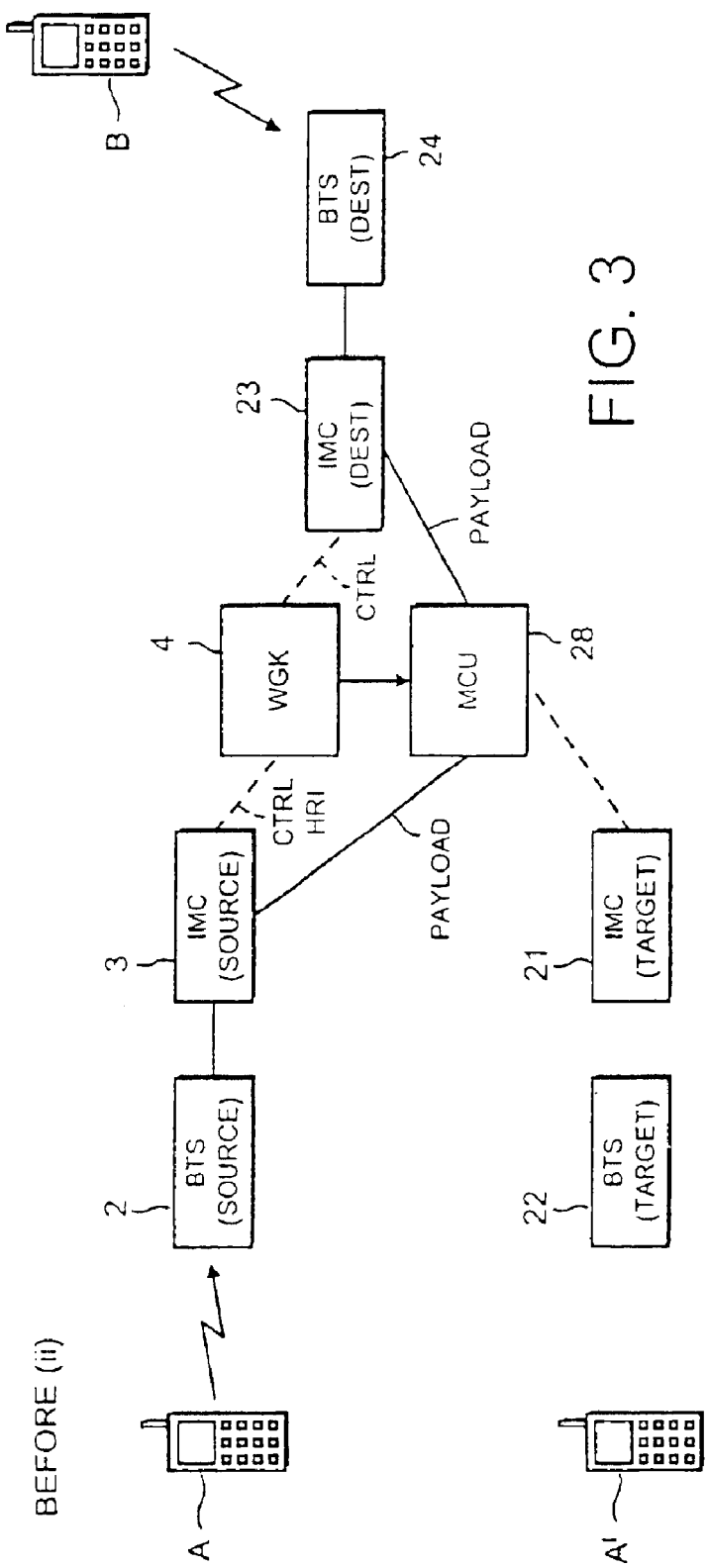
FIG. 3 is a block diagram illustrating the communication pathways between components of the WIO system during a first period of the mobile station handover according to a first embodiment.

As shown in FIG. 2, before the handover, mobile station A communicates with mobile station B by transmitting an RF, timeslot-based signal to the source base transceiver station 2 which down-converts the signal and sends it to the source intranet mobile cluster interface 3. The source intranet mobile cluster interface converts the voice data into a packet-based format (PAYLOAD) and sends it, via the MCU 28, to the destination IMC 23. A CTRL message is formulated and sent to the gatekeeper 4. The gatekeeper 4 identifies from the CTRL message the destination terminal as the mobile station B and then sends a further packet-based signal CTRL, via the IP-router 10, to the destination intranet mobile cluster interface 23. The destination intranet mobile cluster interface 23 converts the PAYLOAD into GSM timeslot format and forwards it to the destination base transceiver station 24 which up-converts the signal to RF and transmits it to mobile station B.

When the IMC 3 determines, in the manner described earlier, that a handover of MSA to another cell is required the IMC issues handover required indication HRI. The IMC 3 also generates, based on the levels of the signals the MSA has reported as having been received from the surrounding base transceiver stations, a list of suitable target base transceiver stations 22 to which the call could be handed over.

The gatekeeper 4 is provided by the HRI with a candidate list which is a list of cell identifiers (i.e. local Area Code and cell identifier) which the gatekeeper resolves into a choice of target gateways. For the purposes of the following description it is assumed that all the calls are switched via the MCU 28. However Q931 signalling (CTRL) does not go through the MCU. The gatekeeper 4 controls the MCU via MC-CTRL packets.

When the gatekeeper 4 receives the HRI message and the candidate list from the source intranet mobile cluster interface 3, it selects a target IMC 21 from the candidate list.

The gatekeeper 4 then invites the target intranet mobile cluster interface 21 to connect to the multipoint control unit 28 so as to form a multipoint conference. In this manner, a communications link between the target intranet mobile cluster interface 21 and the multipoint control unit 28 is set up by the gatekeeper 4. However, the existing link between the source mobile cluster interface and the multipoint control unit 28 is not disconnected at this time.

From FIG. 4 it can be seen that once the communications link between the target intranet mobile cluster interface 21 has been set up by the gatekeeper 4, the mobile station A is, in fact, communicating with the multipoint control unit 28 via two separate communications links: firstly via the source base transceiver station and the source intranet mobile cluster interface and secondly via the target base transceiver station 22 and the target intranet mobile cluster interface 21.

As illustrated in FIG. 4a, the multipoint control unit 28 is operable to multiplex the PAYLOAD packets input to it. Signals transmitted by the mobile station A are input to it twice firstly (S) from the source intranet mobile cluster interface 3 and secondly (T) from the target intranet mobile cluster interface 21. These signals are multiplexed together and sent to the destination mobile station B via IMC 23. Similarly, the signal (D) transmitted by the destination mobile station B is input to the multipoint control unit 28 from the destination intranet mobile cluster interface 23 and is routed by the multipoint control unit 28 both to the source intranet mobile cluster interface 3 and to the target intranet mobile cluster interface 21.

There is in effect, therefore, a three-way multipoint conference taking place with the three endpoints being the mobile station A in the source cell, the mobile station A in the target cell and the mobile station B in the destination cell. Such a multipoint conference is known per se and is described in H.323 protocol.

Once the three-way multipoint conference has been established and the call is successfully connected at the target IMC, the gatekeeper 4 then operates to disconnect the original communications links between the source intranet mobile cluster interface 3 and the multipoint control unit 28 (FIG. 5).

In other words, the original communications link between the mobile station A and the multipoint control unit 28 are not disconnected until the new connections have been established, i.e. handover has been effected to a level which is satisfactory to the gatekeeper 4. This means that the original call path can continue to be utilised if handover is not successful at the target IMC.

At this point, the handover is considered to be completed.

In this manner, the mobile station A is handed over from a first cell of the WIO system to a second cell. Since the old communications links from the source cell are not disconnected until some time after the new links are set up, data loss is reduced.

Thus, breaks in the packet stream are minimised reducing packet loss and improving communications links. Also, the handover of MSA is invisible for user B.

What is claimed is:

1. A communications network comprising:
    a central controller which operates to control a zone of the network and which provides a conference call facility;
    at least one gateway engaged in a call with a mobile station via a first communication channel;
    means for generating a hand-off required indication indicating that handover of the call is needed;
    means at the central controller for receiving said hand-off required indication and opening a conference call channel as a second communication channel for the call; and
    means for handing over said call from the first to the second communication channels and, if the handover is successful, causing the first communication channel to be closed.

2. A network according to claim 1, which comprises a switched packet communication path by means of which the means for handing over, central controller and the gateway are connected.

3. A network according to claim 1, wherein the gateway comprises packet generating means for generating a packet addressed to said means for handing over including control information comprising a candidate list of alternative cells to which the call could possible be transferred.

4. A network according to claim 1, wherein the gateway is operable to receive RF information from a mobile station, said RF information including call data, and to convert said RF information into a packet for transmission to the gatekeeper.

5. A network according to claim 1, wherein the central controller is operable to multiplex the first and second communication channels, such that the call is conveyed simultaneously by both of said channels until the first communication channel is closed.

6. A network according to claim 3, wherein the gatekeeper comprises means for selecting a target gateway based on the cells in the candidate list, and for causing said central controller to open the conference call channel to said selected target gateway as a second communication channel.

7. A network according to claim 1, which is an internal cellular communications network and which comprises an interface for connection to an external network which includes an external controller such that said call can comprise a first mobile station in the internal cellular communications network and a second mobile station in the external network.

8. A method of effecting handover of a call which at least one mobile station is engaged via a first communication channel in a communications network comprising a central controller which operates a zone of the network and provides a conference call facility, in which method:
    a hand-off required indication is issued indicating that handover of the call is needed;
    the central controller receives said hand-off required indication and opens as a second communication channel a conference call channel;
    handover of said call is effectuated from said first to said second communication channel; and
    if the handover is successful the first communication channel is closed.

9. A method according to claim 8, wherein the hand-off required indication comprises a packet which is conveyed to the central controller via a switched packet communications path of the network.

10. A method according to claim 8, wherein the mobile station transmits call data as an RF signal, said call data being converted into a packet for transmission via a switched packet communications path of the network.

11. A method according to claim 8, which comprises the step of multiplexing the call via the first and second communication channels at the central controller, prior to closing the first communication channel.

12. A communications network comprising:
    a central controller which operates to control a zone of the network and which provides a conference call facility;
    at least one gateway engaged in a call with a mobile station via a first communication channel;
    means for generating a hand-off required indication indicating that handover of the call is needed;
    means at the central controller for receiving said hand-off required indication and opening a conference call channel as a second communication channel for the call; and
    means for handing over said call from the first to the second communication channels and, if the handover is successful, causing the first communication channel to be closed,
    wherein the central controller is operable to multiplex the first and second communication channels, such that the call is conveyed simultaneously by both of said channels until the first communication channel is closed.

* * * * *